Feb. 7, 1967   M. L. WEIDIG   3,302,492
SENSING DEVICE
Filed Nov. 17, 1964   10 Sheets-Sheet 1

INVENTOR.
MILES L. WEIDIG.
BY
Edward Jutz
ATTORNEY.

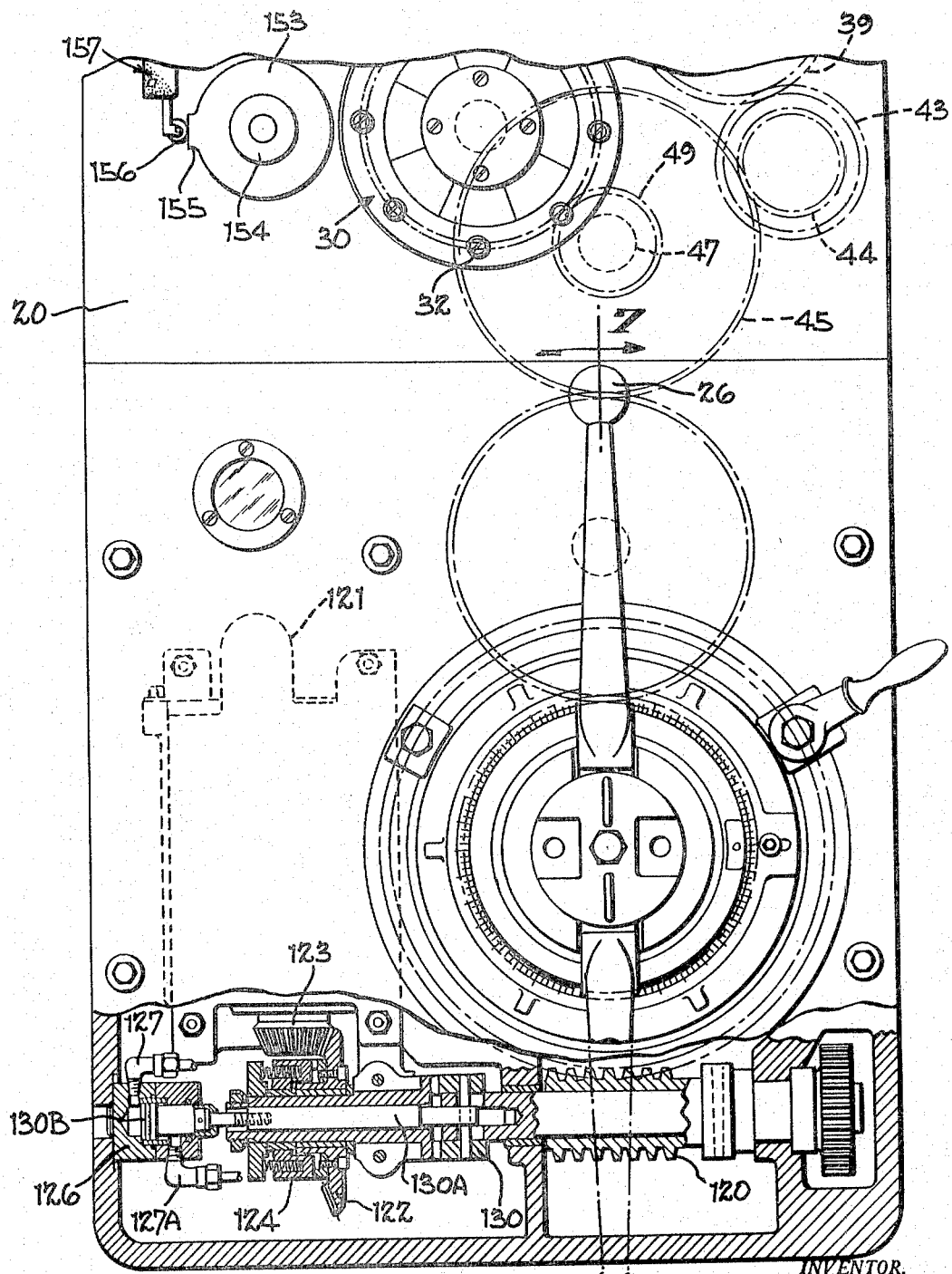

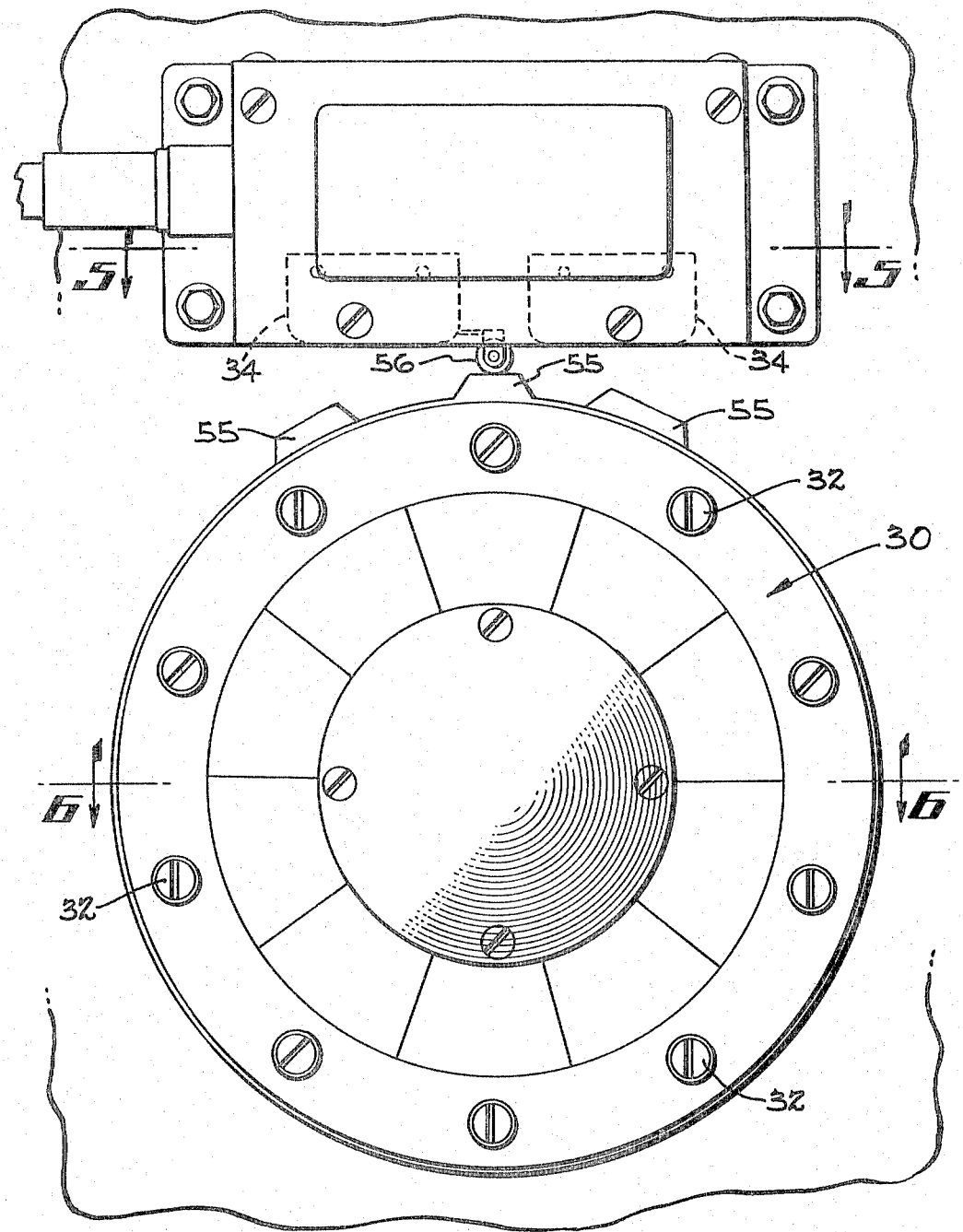

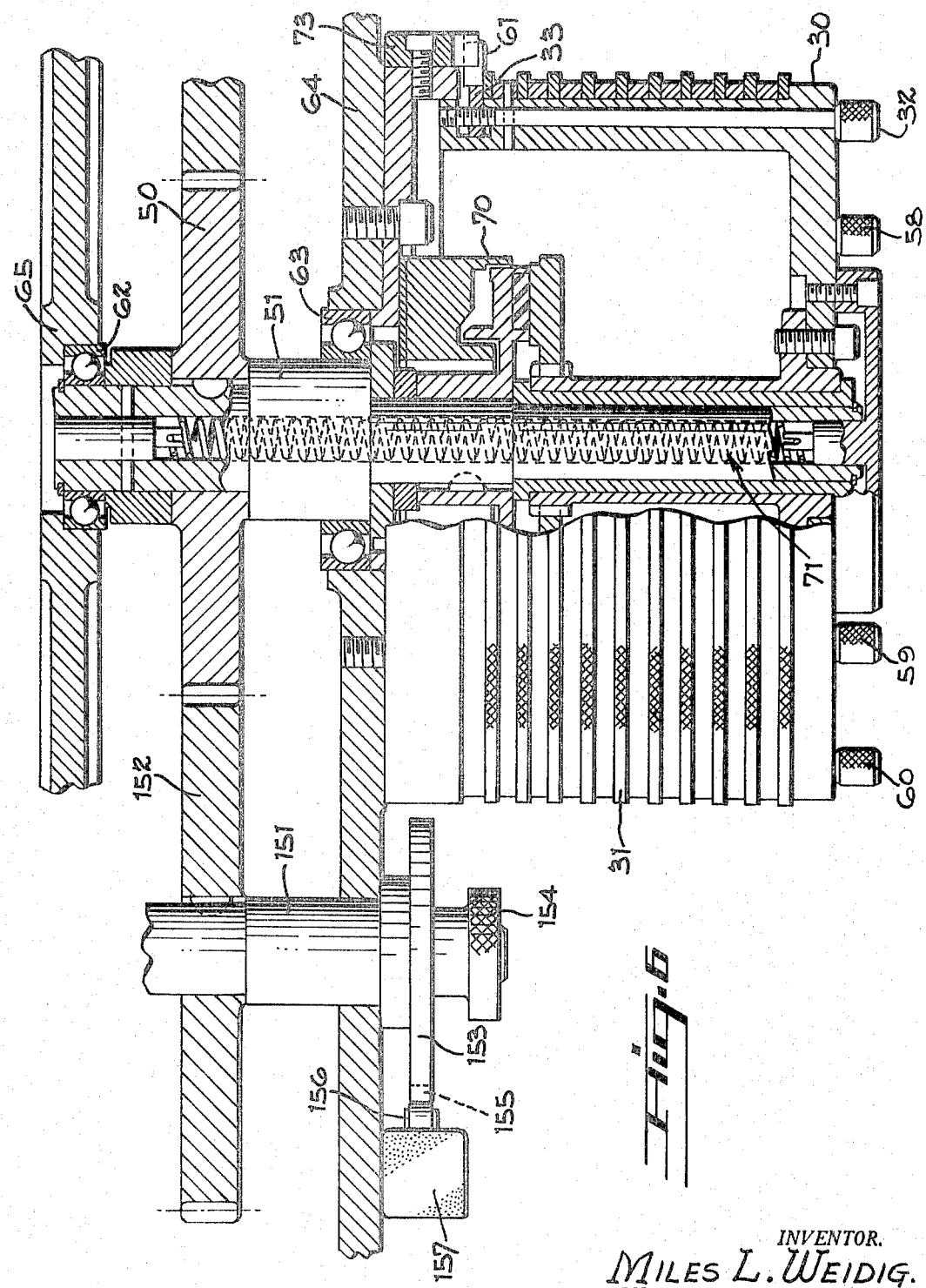

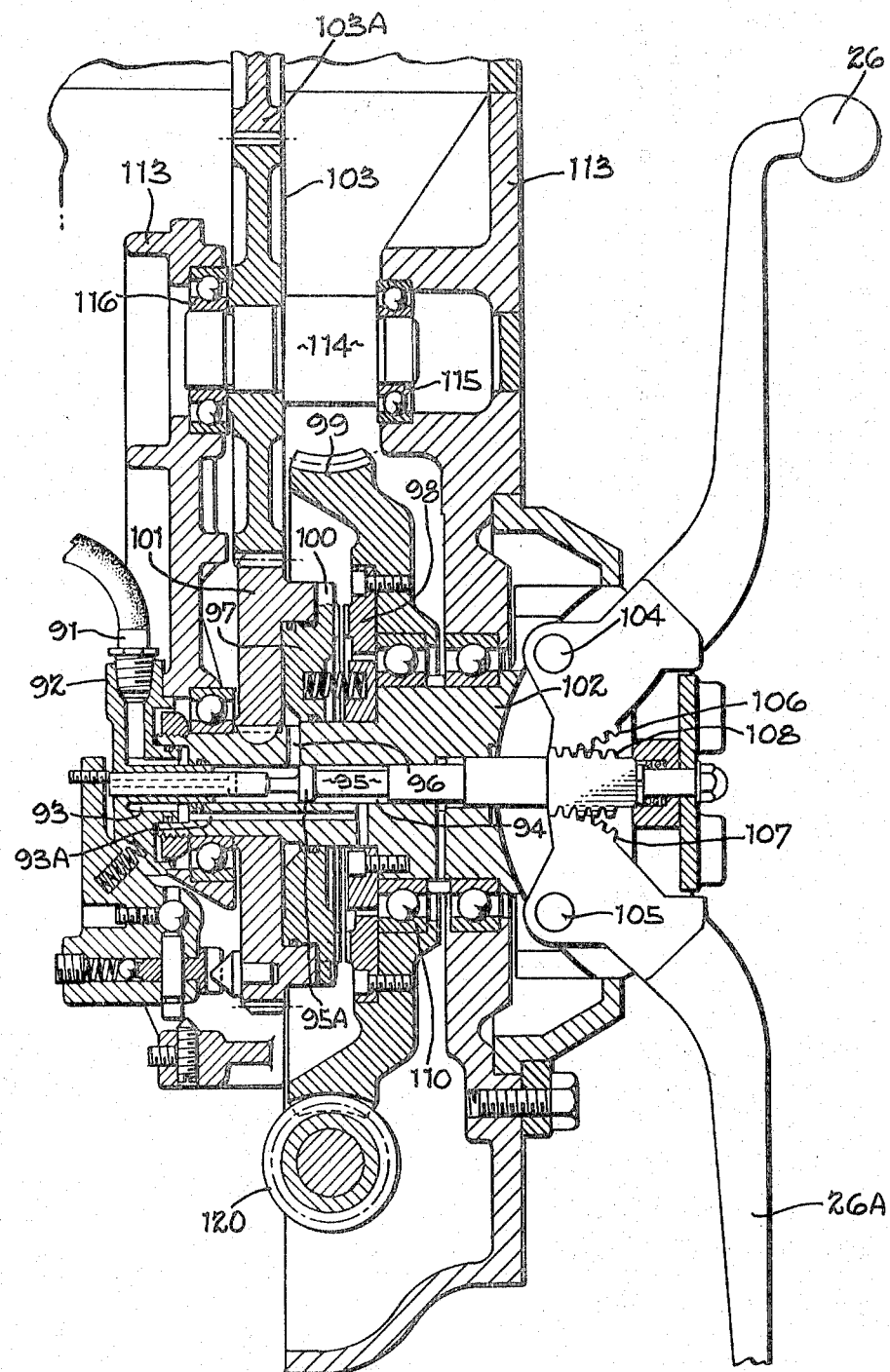

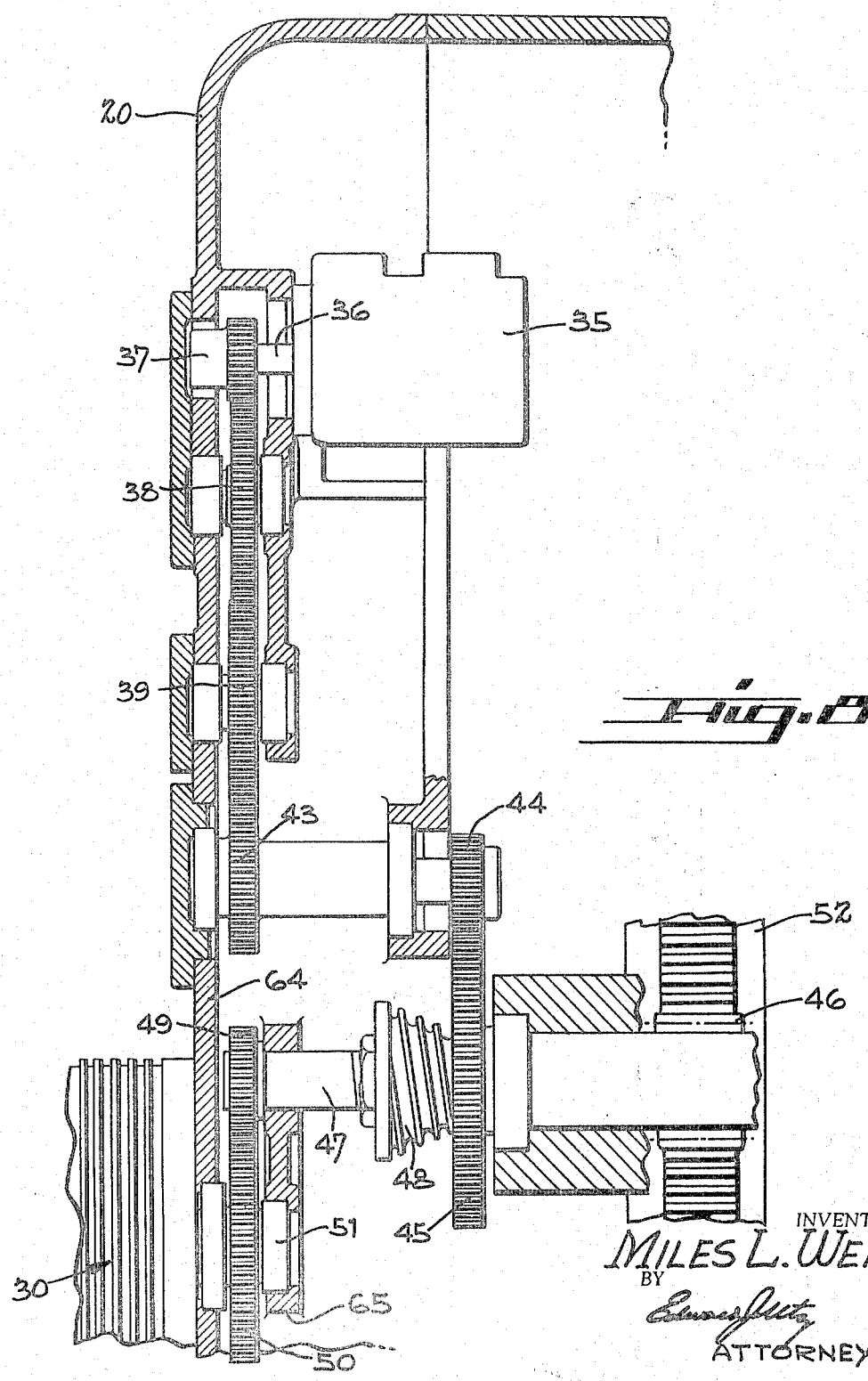

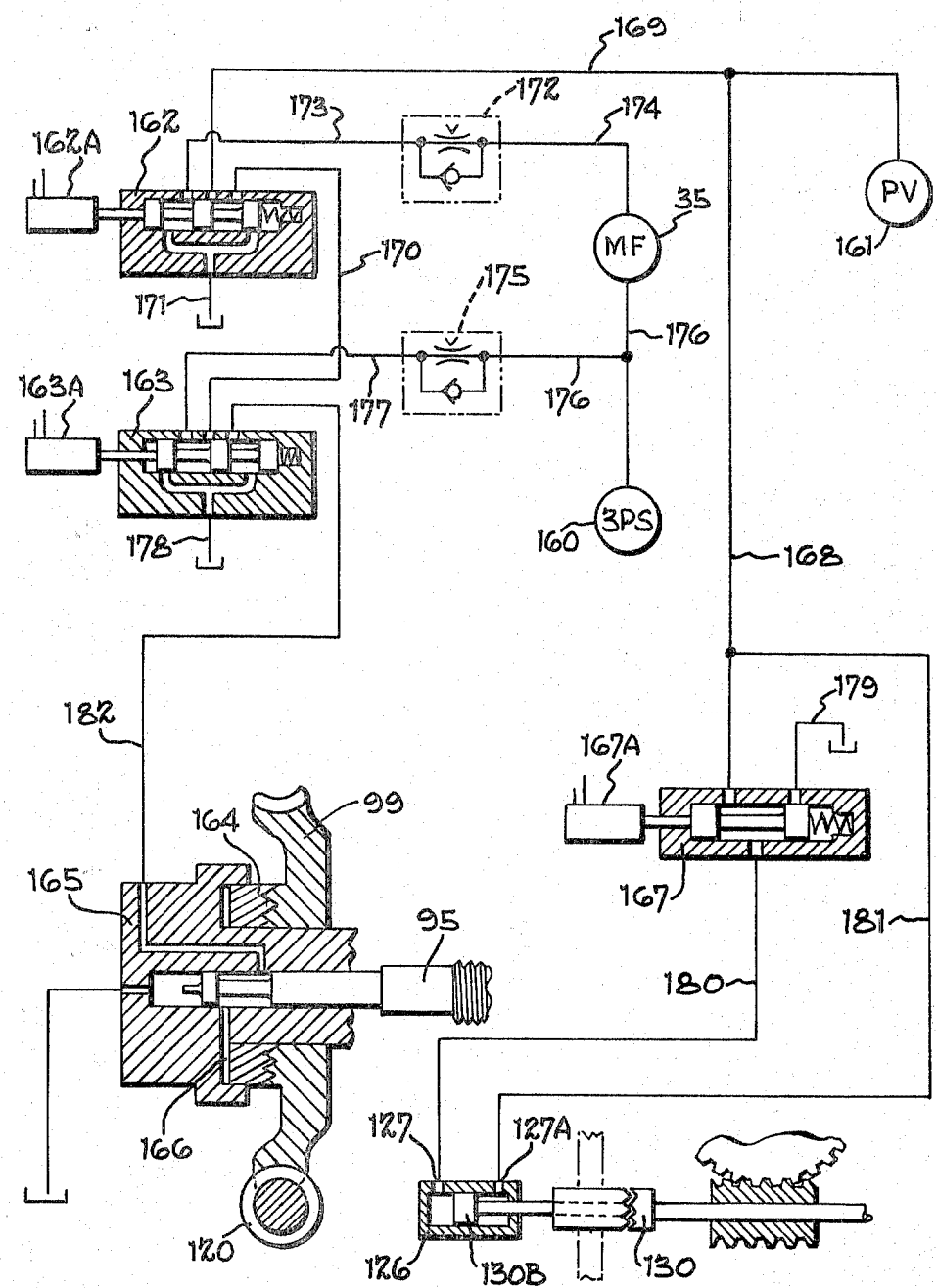

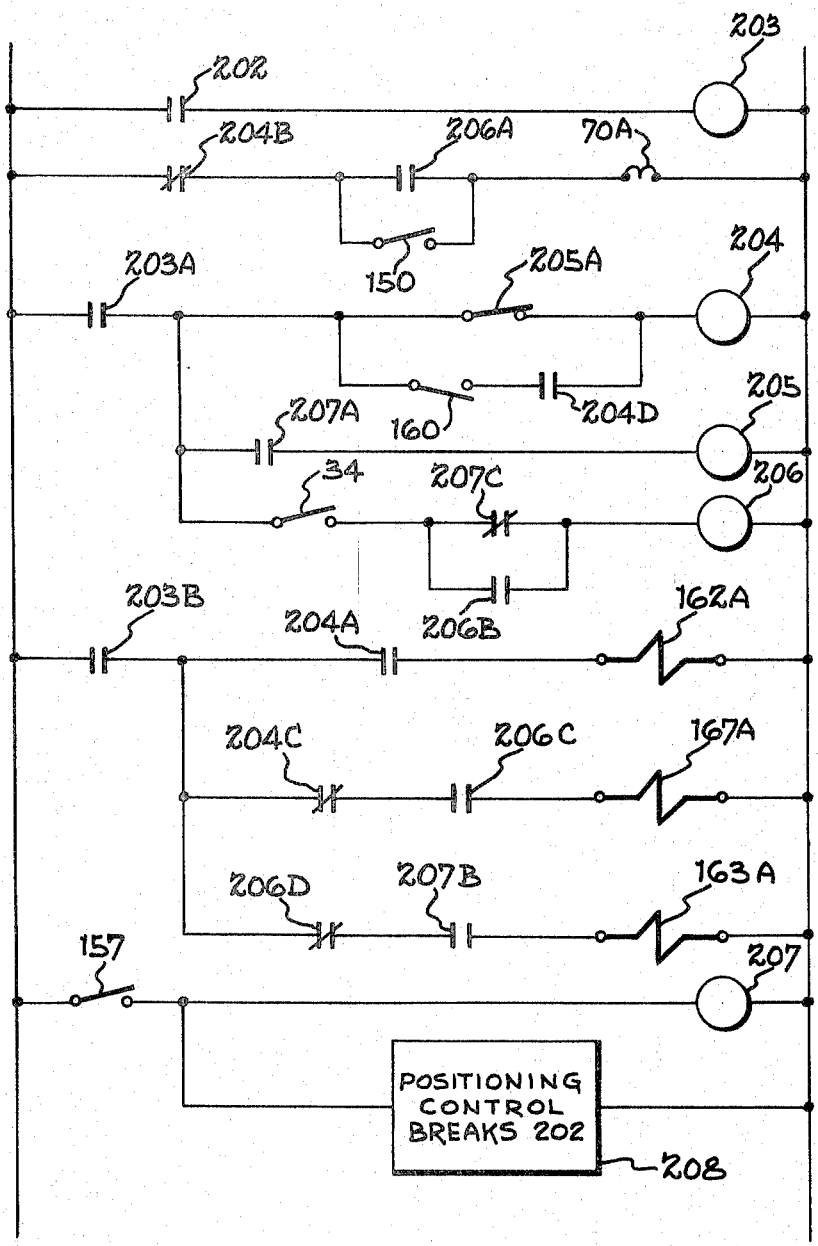

United States Patent Office 3,302,492
Patented Feb. 7, 1967

3,302,492
SENSING DEVICE
Miles L. Weidig, Kenwood, Ohio, assignor to The Carlton Machine Tool Company, Cincinnati, Ohio, a corporation of Ohio
Filed Nov. 17, 1964, Ser. No. 411,865
4 Claims. (Cl. 77—32.1)

My invention relates to a spindle depth control device such as is used with machine tools of the class having a spindle for carrying a tool. In drilling and boring machines such as the type known in the art as drills and boring mills, it is desirable to move the spindle carrying the tool to an operative position. It is also desirable in modern day practice to move the spindle carrying the tool to its operative position in the minimum amount of time. In drills and boring mills of the type which I have just described, it is also necessary to determine the distance into the work which the tool will penetrate once this sensing device which forms the basis of my invention becomes operative. It is also desirable to predetermine the depth of the penetration of the tool into the workpiece by means of a setting device and such predetermined depth will be constant for continuous operation regardless of the position of the workpiece with reference to the tool. In other words, the surface of the workpiece with reference to the position of the spindle carrying structure and with reference to the depth to which the tool will penetrate the workpiece need not be fixed. In order to accomplish an automatic setting of the depth of the cut without reference to the distance between the tool carrying member in its retracted or inoperative position and the workpiece, I have devised a structure which eliminates the necessity of a predetermined measurable distance between the workpiece and the tool in its inoperative position, and which only requires that a setting be placed in the machine to predetermine the depth to which the tool will penetrate the workpiece, measured from the surface of the workpiece.

Therefore, the tool, by using my invention, will automatically drill to a predetermined depth from the surface of the workpiece after contact with the workpiece.

With my invention, it is desirable that the traverse of the spindle from its inoperative or retracted position to the workpiece be made at the maximum possible speed permitted by the strength of the tool taking into account the effect of the impact of the tool on the work at its traverse rate.

With reference to cam settings and predetermined settings of the depth of the feed in a machine tool of the class which we have described, it is only necessary in my machine to make one setting for any given feed depth, regardless of the position of the surface of the workpiece with reference to the spindle carrying member.

In general, in my invention I employ a fluid motor or a direct hydraulic spindle driving mechanism, which drives a rack pinion through a gear train. This rack pinion drives or traverses a spindle mounted in the head or tool carrying portion of the machine.

The fluid motor is geared directly to the spindle. The flow of oil through the fluid motor will cease when the spindle stops, causing a drop in pressure in a portion of the system which will cause the pressure switch to become operative to perform electrical sensing functions to be described below. The electrical signal which is the result of the operation just described has several functions. Firstly, it disengages the fluid motor drive or other hydraulic drive; secondly, it engages the feed drive, and thirdly, it engages the selective drum device so that the tool travels to the proper depth.

The feed clutch provided on this type of machinery is hydraulically engaged, and the feed depth drum revolves until a predetermined feed depth settable member is engaged to end the feed penetration, and then the spindle is retracted to its starting position by an automatic device to be described.

I have further provided in my invention for a disengagement of the worm clutch to initiate a time cycle to allow for spindle dwell. Dwelling is the process in drilling and boring operations whereby the tool is permitted to remain in its final depth position for a period of time while rotation continues, to permit the squaring out of the hole. When the tool reaches the maximum of its penetration as determined by the drum device, an electrical signal causes a four-way valve to be energized. Simultaneously with the energization of this solenoid control valve, the feed clutch is disengaged, and fluid is allowed to move through the fluid motor to cause the fluid motor to move in a direction opposite that previously described to cause the spindle to be moved to its retracted position. This is known as rapid retraction of the spindle, or the rapid retraction phase of the work cycle. Normally, in my invention, the cycles can be repeated indefinitely by using positional control devices so that the spindle is moved laterally to a new position and then through cooperation with the drum and settable members which settable members are preselected to predetermine a depth position by means of tape or other preselect means, the cycle is repeated and the same depth or other depths of the tool may be accomplished.

The principal object of my invention, therefore is to provide for the drilling or boring of holes in workpieces, without employment of an operator to operate the machine, by having a device which may be automatically positioned and which will automatically drill or bore a hole to a predetermined depth, regardless of the position of the workpiece with relation to the spindle carrying tool and in a minimum of time.

Another object of my invention is to provide a device which employs hydraulic pressure or fluid motors whereby when a certain pressure switch or pressure sensing device which is sensitive to the cessation of movement of fluid within the system causes certain electrical signals to activate a feed drum to cause clutches and other mechanisms to become engaged or disengaged to perform the operations for which this machine is intended. It is to be noted that these pressure sensing devices and pressure sensing gauges are automatically predeterminedably settable so that an operator is not required for efficient operation of this device.

Another object of my invention is to provide for a time sequential disengagement of a pair of clutch members utilizing a time delay relay to cause one clutch and then the other clutch to become disengaged. The difference in time between the disengagement of the two clutches is equal to the time of the dwell.

Another object of my invention is to provide for automatic means of feed engagement which become operable when the tool engages the surface of the workpiece so that the measurement of depth of cut is made from this surface, thus insuring accuracy in depth.

Another object of my invention is to provide an automatic means of engaging feed the instant that the tool strikes the surface of the workpiece, not at fixed distance away from this surface, as is common in other automatically cycling machines, thus insuring the minimum possible time cycle for a given machining operation.

Another object of my invention is to provide the means for keeping a clutch engaged so that the settable drum dog members upon completion of the machining phase of the cycle are not rapidly forced back by a return spring but are allowed to return to their normal or reference position at a predetermined rate.

Another object of my invention is to provide means for limiting the travel of the spindle from its principal basic position within the spindle carrying mechanism of the machine, to reduce the cycle time to a minimum. I have provided means in my invention for adjusting the reference position relative to the workpiece. In other words, the configuration of the workpiece upon which the drilling or boring is to be performed will determine the setting of the reference position. The machine then operates in the same manner as previously described except with the adjustable reference position as its new point of reference.

Another object of my invention is to provide means whereby the mechanism will not be damaged due to the impact of the spindle returning to its retracted position or reference position. This is accompanied by utilizing the feed clutch so that the feed clutch is engaged momentarily prior to the reach of the reference position of the spindle to provide for a smooth return to reference position or beginning point. This in effect acts as a brake under proper conditions and prevents wear and tear on the various parts due to the utilization of hydraulic fluid as a braking means. Thereby I have accomplished in this highly automated machine the utilization of one clutch to perform two functions, thereby providing for a minimum number of movable and operable parts.

Another object of my invention is to provide for the movement of the spindle from its reference or retracted position to the workpiece at the maximum possible speed commensurate with the stability and strength of the tool along with its size. This is accomplished by the utilization of adjustable valve mechanisms whereby the flow of the fluid to or from the fluid motor may be adjusted to account for these conditions. This last-named object provides for the adoption to the machinery of adaptive control methods.

Other objects and objects relating to details of construction and economies of operation will definitely appear from the detailed description to follow. In one instance I have accomplished the objects by my invention of the devices and means set forth in detail in the following specifications. My invention is clearly defined and pointed out in the appended claims and structures which are useful in carrying out my invention are illustrated in the accompanying drawings. It is to be understood, however, that the devices and structures shown in the drawings which accompany this application for a patent are not limited, but that substitutes in the electrical and hydraulic art may be made and are within the contemplation of my invention.

FIGURE 3 shows the front of the machine with the quick return levers and shows a partial sectional view of the worm clutch.

FIGURE 4 shows a view of the switch box and drum.

FIGURE 5 is a detailed, sectional view taken along the lines 5—5 of FIGURE 4 and looking in the direction of the arrows at the ends of the section lines.

FIGURE 6 is a detailed, sectional view taken along the lines 6—6 of FIGURE 4.

FIGURE 7 is a detailed, sectional view taken along the lines 7—7 of FIGURE 3.

FIGURE 8 is a view in section showing the gear train between the rapid traverse motor, the drum, and rack pinion center.

FIGURE 10 is a diagrammatic view of the hydraulic circuit.

FIGURE 11 is a diagrammatic view of the electrical circuit.

In the drawings, the same reference numerals refer to the same parts throughout the several views, and the sectional views are taken looking in the direction of the arrows at the ends of the section lines.

In general, my invention involves a traversing spindle with a tool carried in said spindle adapted to perform drilling and boring operations. This invention accomplishes the ultimate object automatically and without the interference of or employment of manual operations and is intended to be completely automatic in its function. The motivating force for the machinery described in my invention in this particular case is hydraulic fluid. The hydraulic fluid is caused to act in response to electrical signals which are set in motion by various control devices well known in the art and variously described as numerical or electronic control mechanisms. This encompasses tape control as well as electronic tube control or other means of activating the hydraulic fluid in this machine to perform its desired functions. The tool performs its function in the art by drilling or boring into workpieces. This drilling and boring must be to preselected depths for various sized holes located at various lateral positions and at varying distances from the reference point. Means are provided for moving the spindle which carries the tool to the workpiece by utilizing hydraulic fluid in combination with a fluid motor, or by using other hydraulic means to cause the spindle to traverse to a cutting or working position in the shortest possible time, and then by causing this spindle preset to penetrate into the workpiece to an automatically preselected depth, and then if it is desired, to permit the tool to dwell for a predetermined time at the maximum point of its penetration, and then to return to its reference or retracted position. The return of the tool to its retracted position is accomplished by reversing the direction of oil flow through the fluid motor in response to an electrical signal produced when the preset depth cam strikes a limit switch, signifying that the desired depth has been reached.

The reference position is adjustable so that the spindle need not return to its full non-operable position but by means of the adjustment which I provide, the stroke of the spindle may be varied with reference to the surface of the work. This of course is necessary to accomplish the speed with which this machine must operate to perform its automatic operation.

Figure 1:
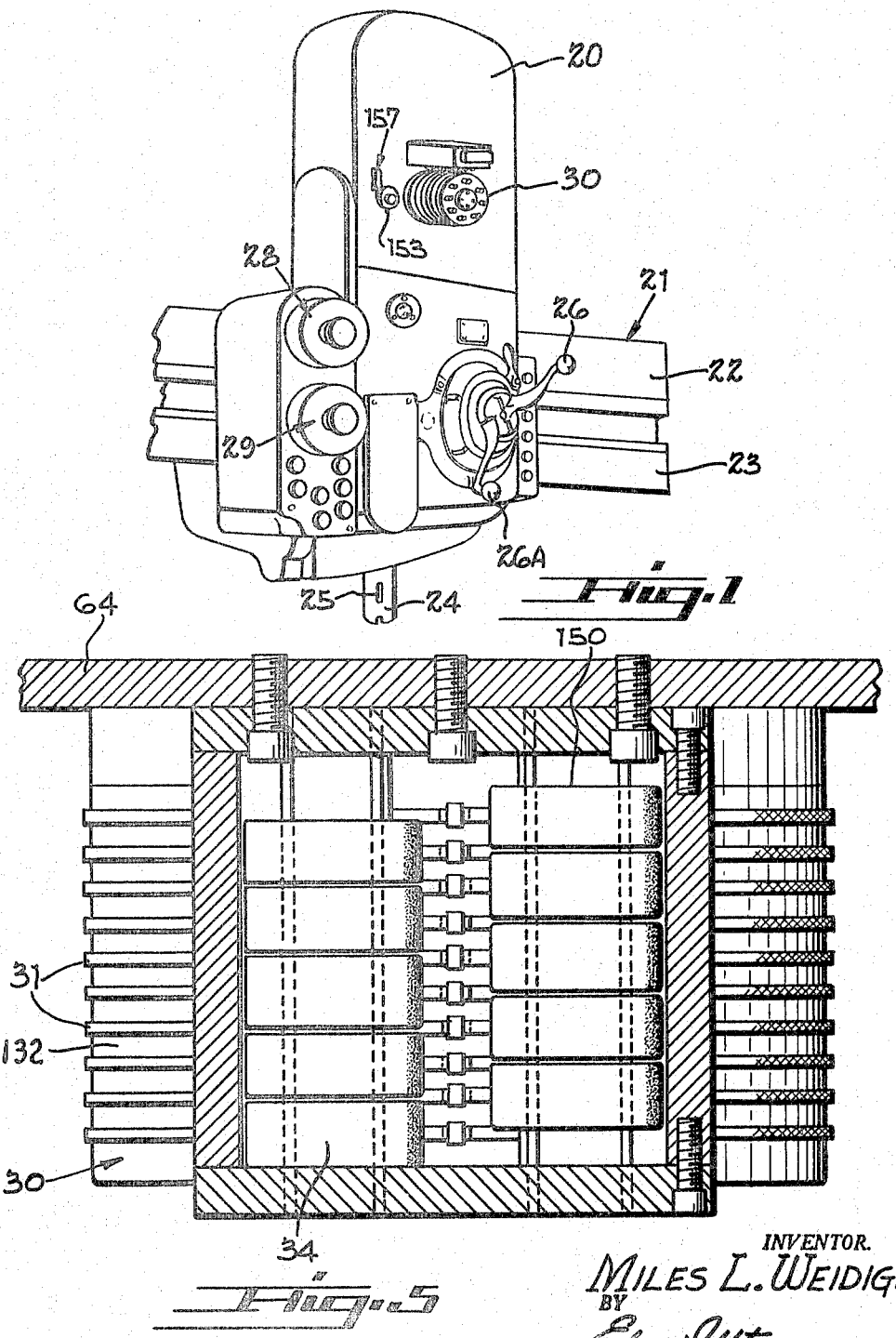
FIGURE 1 shows a drill head of a drilling machine or boring machine mounted on an arm or rail for sliding movement.

Referring to the numbered parts of the drawings, reference is made to FIGURE 1 in which I show a head 20 adapted to slide on an arm or rail 21. The arm or rail 21 is provided with ways such as 22 and 23. Means are provided (not shown) for holding the head 20 in a rigid or fixed position along the rail or arm. The head is provided with a spindle 24 which projects from the lower portion of the head 20 and is provided with a suitable slot for driving a tool such as 25. This slot is not intended to limit this invention, but is shown for operative purposes only. The movement of the spindle to and from the workpiece is controlled by means of levers 26 and 26a which are adapted to engage suitable clutch mechanisms which will be described below.

Where it is desired to manipulate the mechanism of the machine, that is, to set up some particular feed depth, these levers are utilized. For automatic preselection of speed and feed of the spindle, I have provided speed dials 29 and feed dials 28, which mechanism is the subject of U.S. Letters Patent No. 2,866,347 issued to me on January 3, 1959 and assigned to The Carlton Machine Tool Company of Cincinnati, Ohio.

In my invention, I provide a depth dog drum 30 which carries a plurality of rings, such as 31, which can be positioned and locked in place. The locking and securing of the rings in a preselected position is made by means of a lock screw 32 and shoe 33. Limit switches 34 which are actuated by the operation of the rings 31 are mounted on the front of the head 20. The spindle 24 is driven in rapid traverse by a fluid motor 35 having a shaft 36, which drives a gear 37 meshing with a gear 38 to drive a gear 39 meshing with a gear 43. The gear 43 is mounted on a shaft which also carries a gear 44, which meshes with gear 45; gear 45 turns the shaft 47 which has a rack pinion 46. The teeth drive a spindle rack sleeve 52, which moves the spindle 24 longitudinally. Shaft 47 is also provided with a balancing spring pulley 48, which serves to compensate, through cable means (not shown) for the weight of the tools carried by the spindle. Shaft 47 also carries a gear 49 which meshes with a gear 50 (see FIG. 8). Gear 50 is mounted on a shaft 51 which is a common shaft for the depth dog drum 30.

Referring now to FIGURES 4, 5 and 6 of the drawings, I show in FIGURE 4 the front face of the depth dog drum as is indicated generally in FIGURE 1 mounted on the front of the machine and designated as 30. I provide a series of rings, in this instance, 10, as indicated as at 31. These rings have projections such as 55, and each of the rings is provided with but one projection. The rings are settable to predetermined positions for the purpose of causing the roller 56 on a typical micro-limit switch 34 mounted on the front of the machine to be operable to operate the solenoid valves which control feed and rapid traverse.

Figure 2:
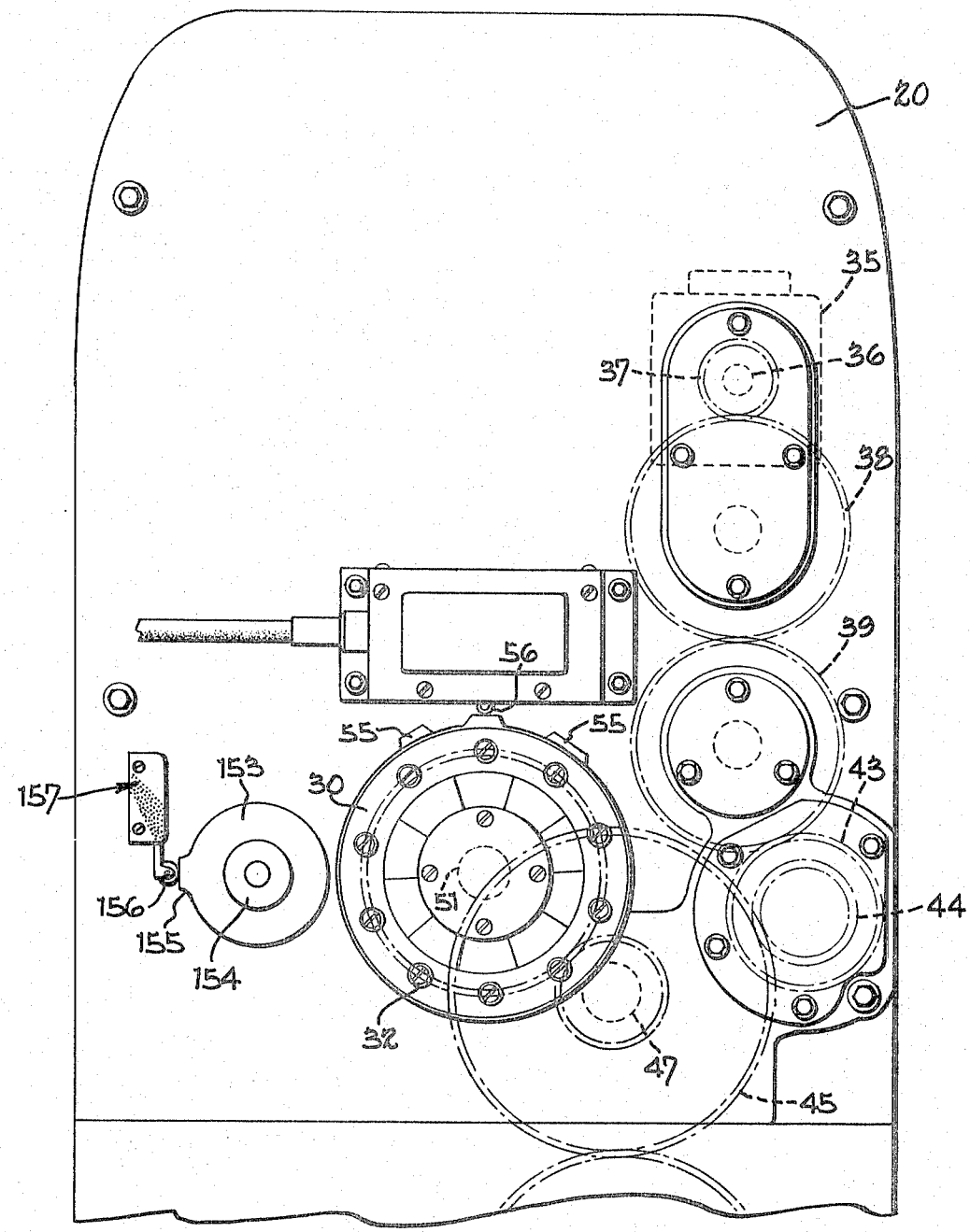
FIGURE 2 is a view in front elevation showing the drum and switch box and reference adjustment cam utilized in my invention.
Figure 9:
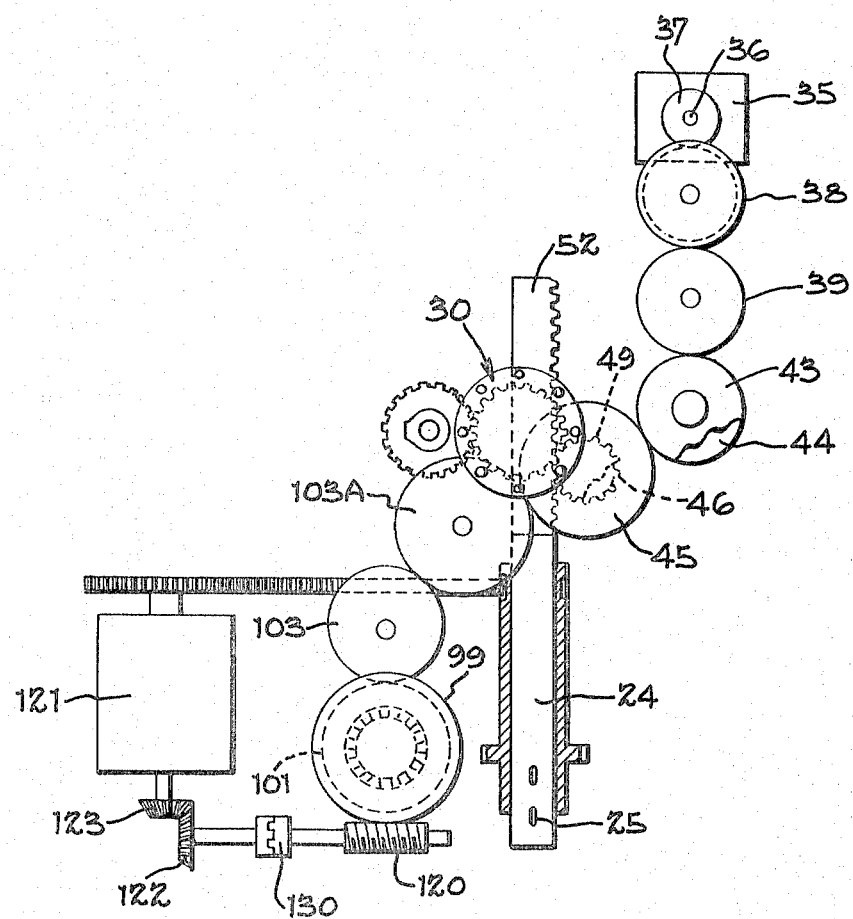
FIGURE 9 is a diagrammatic view of the system for moving the spindle.

The setting of the drum rings, such as 31, predetermines the depth of cut of the tool mounted in the spindle 24 in relation to the surface of the work. Movement of the drum carrying the rings is initiated by the striking of the workpiece by the tool carried in the spindle 24. The rings 31 are held in movable spaced relationship around drum 30 by means of separator members, such as 132. This permits the rings 31 to be moved independently of the drum. After the position of one of the settable rings has been determined, it is locked in this position by means of screws such as 32. Each of the rings is provided with one of these locking screws, also indicated at 58, 59 and 60. The separator also acts as a means for taking up the clamping thrust generated when the screw, such as 32, is turned. The thrust is applied when the shoe 33 is pulled against ring 31. The drum 30 carrying the drum rings 31 is caused to rotate through rotation of the shaft 51 by means of gear 50 mounted on said shaft 51, which in turn is driven by gear 49 (FIG. 8). The shaft 51 is journaled in bearing 62 and 63, which are mounted in the frame 64 and 65. An electrical clutch 70 when it is disengaged allows the drum 30 to be maintained in a stopped or inoperative position through a torsion spring 71 carried within the shaft 51. The drum has a stop member 61 which abuts against a lug 73 secured to the frame member 64. When the elements of the clutch 70 are engaged, the drum 30 with its selected drum rings is compelled to rotate along with the shaft 51 which is constantly revolving while the spindle 24 is being traversed. When the limit switch 34 (FIG. 4) is caused to operate by the engagement of the selected lug 55 on the ring such as 31, with a roller 56 of said limit switch, an electrical signal is generated which ends the drilling phase and begins the return of the spindle 24 to its retracted position. There are ten limit switches similar to limit switch 34. However, only nine of these limit switches are utilized in setting depth of the feed. The last limit switch 150 (FIG. 5) signalizes the disengagement of clutch 70 a short time before the completion of the return stroke of the spindle. Refer to FIGURE 6 wherein I show a shaft 151 which has mounted thereon a gear 152 which meshes with gear 50. A cam 153 is rotatably mounted on shaft 151 and locked into a selected position by a nut 154. The lug 155 shown in FIGURE 2 trips roller 156 on limit switch 157. This causes termination of the cycle at the end of the return stroke of the spindle 24. The length of the return stroke of the spindle 24 is adjustable by manually positioning the cam 153 to thereby limit the return stroke of the spindle and to set up a new reference or beginning point.

Referring now to FIGURE 7, when the pressure switch 160 shown in FIGURE 10 is activated, fluid pressure is supplied through connection 91 into a rotary coupling 92. The rotary coupling 92 contains a passageway 93 which permits fluid under pressure to enter into a chamber 94, through passage 93a which in certain positions of the spool 95 permits the fluid under pressure to enter port 96. This forces the resiliently mounted clutch member 97 into engagement with the face member 98 which is affixed to and carried within worm gear 99. Member 97 is provided with tongues 100 which engage keyways on a gear 101 which is keyed to valve body 102. This gear 101 meshes with idler gear 103 which meshes idler gear 103a which meshes with rack pinion gear 45. To engage the feed clutch manually for set up purposes, and render it operational for automatic cycling, the valve spool 95 is moved inwardly to permit the valve spool land 95a to pass port opening 96. Levers 26 and 26a are pivoted about pivots 104 and 105 respectively, and are provided with segments such as 106 and 107 having toothed portions which engage the rack 108, integral with the valve spool 95. Worm gear 99 is rotatably mounted on valve body 102 through journalization in a bearing 110. Gear 103 is mounted on a shaft 114, which shaft is journaled in bearings 115 and 116, carried in the housing 113. The worm gear 99 is driven by worm 120, which in turn is driven by the feed unit indicated generally at 121 (FIG. 3), through bevel gears 122 and 123. The drive of the worm 120 from the feed unit 121 through the bevel gears 122 and 123 contains a thrust safety clutch 124. The feed unit 121 is clutched to the worm 120 by means of the jaw clutch 130. The jaw clutch 130 is actuated by a push rod 130a which is connected to a piston 130b within cylinder 126. Fluid is supplied periodically to the cylinder 126 through connection 127. Fluid is supplied from the pressure main through port 127a. When pressure enters the cylinder 126 through port 127, the clutch 130 is disengaged. Constant pressure supplied through port 127a engages the clutch when port 127 is vented.

*Hydraulic circuit*

The hydraulic circuit is shown schematically in FIGURE 10. To provide hydraulic fluid under pressure to perform the functions previously outlined, I use a variable-volume, pressure-compensated pump 161, driven by a standard electric motor, an arrangement well known in the art. The pressure-compensated pump delivers only the quantity of fluid needed in the circuit at any given moment, maintaining the system pressure for which the compensator has been preset, thus eliminating the need for relief valves, and reducing heat losses to a mimimum. Other sources of fluid under pressure may be employed without affecting the action of the circuit.

The outlet port of the pump is connected to a 4-way, 2-position solenoid operated, spring offset valve 162 by line 169. This valve is a standard hydraulic component. A port of valve 162 is connected to another valve of the same type 163, through line 170. The third port of valve 162 is vented to tank through line 171, and the fourth port is connected to a standard adjustable flow control valve 172, by pipe line 173. Line 174 joins the other port of valve 172 to the fluid motor 35. The other port of the fluid motor is connected to another flow control valve 175 which is identical with valve 172, by line 176. The fluid port of a standard pressure switch 160 is connected to line 176.

The other port of valve 175 is joined to a port of valve 163 by line 177. The third port of valve 163 is vented to tank through line 178, and the fourth port of this valve is connected by line 182 to the hydraulic feed clutch housing shown schematically at 165. The worm gear 99, and the movable clutch member 164 are shown schematically. The annular space 166 is pressurized to engage the feed clutch. A branch line 168 from line 169 connects with one port of a 3-way, 2-position, spring offset solenoid valve 167. Another port of this valve is vented to tank through line 179, and the third port of valve 167 is joined to port 127 of cylinder 126 by line 180. Cylinder 126, piston 130b, and worm clutch member 130 are shown schematically in FIGURE 10. A branch 181 from constant pressure line 168 connects with port 127a of cylinder 126.

When the solenoid of valve 167 is de-energized, system pressure is applied to both sides of piston 130b. Since the head end of this piston presents a larger area than the rod end, the piston moves in a direction to disengage worm clutch 130.

Similarly, when the solenoid of valve 167 is energized, the head end of cylinder 126 is vented to tank through port 127 and lines 180 and 179. This allows the constant fluid pressure which is applied to the rod end to move piston 130b in a direction to engage worm clutch 130.

When the hydraulic mechanism *is at rest,* as during the period when the spindle is being positioned laterally by the positioning control system, fluid pressure from line 169 is applied to the feed clutch 164 through lines 170 and 182 and valves 162 and 163, since the solenoids of these valves are de-energized at this time. This holds feed clutch 164 in engagement. The shaft of motor 35 cannot rotate since both ports of the fluid motor are vented to tank through valves 162 and 163. The worm clutch 130 is held disengaged since the de-energized solenoid of valve 167 allows fluid pressure to be applied to the head end of piston 130b, as described above.

*Drilling cycle phase I*

The first phase of the drilling cycle is rapid approach in which the spindle, carrying a drill or other tool, is traversed toward the work at a preset rate until contact is made with the work. This phase is initiated by energizing the solenoid of valve 162 which moves the valve spool to its alternate position, directing fluid under pressure to the fluid motor 35 through flow control valve 172. At this time, the bypass creek portion of valve 172 opens to allow unrestricted flow. The outlet port of fluid motor 35 remains vented to tank through valves 172 and 163, permitting the fluid motor shaft to rotate in a direction required to move the spindle toward the work, provided it does not meet any mechanical restrictions. The only mechanical restriction possible, the worm 120 and worm gear 99, are automatically separated from the gear train by the disengagement of feed clutch 164 which occurs when the spool of valve 162 is shifted as described above, because the cylinder space 166 is vented to tank through valve 162. As the fluid motor starts to rotate, moving the spindle toward the work, the flow of fluid from the outlet port of the motor to tank is restricted by flow control valve 175, which has been preset to provide the maximum speed compatible with the type of tool and work material being used. To make my system workable, the maximum volumetric output of hydraulic pump 161 must be substantially greater than the fluid volume required by the fluid motor to produce the greatest spindle traverse speed within the working range of the machine tool. When this relationship exists, a substantial static fluid pressure is present in line 176 during rapid approach because of the setting required in valve 175. This static pressure is transmitted to pressure switch 160, holding it in its closed position, once constant traverse speed has been attained.

*Drilling cycle phase II*

The start of the second phase of the cycle, power feed, occurs almost simultaneously with the impact of the tool upon the surface of the workpiece. This impact stops the longitudinal motion of the spindle and with it rotation of the fluid motor shaft. I use a positive displacement type of motor, which cuts off the flow of fluid through it under this condition. The static pressure in line 176 and on the fluid element of pressure switch 160 drops sharply within a very short time after the motor shaft stops rotating, causing the electrical element of the pressure switch to open. The electrical signal produced thereby is used to start the power feed phase. The pressure drop mentioned above occurs quickly because only a small volume of fluid need drain out of line 176 through valve 175 to tank to reduce this static pressure to atmospheric pressure. In other variations of my device, I detect changes in the rate of movement of the spindle by means of the pressure switch and initiate feed engagement or other functions with the resulting electrical signal, without completely stopping the spindle motion. I have also used pressure changes occurring in lines leading to and from various types of fluid transducers, such as hydraulic cylinders, to produce electrical signals to initiate functions, when the rate of movement involved changes.

In this case, the electrical signal produced by the opening of the pressure switch de-energizes the solenoid of valve 162, restoring the associated portion of the hydraulic circuit to its "at rest" condition, and engaging the feed clutch 164. The same electrical signal is used to energize the solenoid of valve 167, simultaneously engaging worm clutch 130, as described previously. The engagement of the feed and worm clutches transmits a power feed drive from adjustable feed unit 121, through bevel gears 123 and 122, worm 120 and worm gear 99, gear 101, and the other intermediate gears previosuly described to rack pinion 46, to cause the spindle to move into the work at a predetermined feed rate. These elements are best shown in FIGURES 3, 7, 8 and 9. The same electrical signal from the pressure switch causes electrical clutch 70 (FIG. 6) to engage, tying the depth drum 30 to shaft 51. When the feed gear train rotates as the spindle moves forward at the preset feed rate, drum 30 and its attached cam rings 31 rotate in proportional relationship with the longitudinal movement of the spindle, measured from the point where the tool has touched the surface of the workpiece. Shaft 51 is constantly engaged with rack pinion 46. During feeding, the fluid motor shaft is free to rotate as required because both ports are vented. When the predetermined feed depth has been reached, the cam ring, such as 31, which is in line with the particular depth limit switch, as 34, FIGURE 5, preselected for the operation in progress, trips the limit switch through roller 56. This produces an electrical signal which ends the feeding phase and starts the last phase of the cycle, rapid retraction.

The electrical signal from switch 34 causes solenoid 163a to become energized, disengaging feed clutch 64 (FIG. 10) by venting area 166 through valve 163. Simultaneously, fluid under pressure is directed through the fluid motor in the opposite direction from that used in rapid approach, in a manner similar to that described before. During the first portion of the return stroke, drum clutch 70 remains engaged, until just before the drum 30 has completed its return to stop 73 (FIG. 6). At this point, an electrical signal from limit switch 150 releases the clutch, allowing the drum to be returned to the stop by torsion spring 71 without damaging impact. After the disengagement of drum clutch 70, shaft 51 continues to rotate as the spindle returns, until the lug on cam 153 (FIG. 6) lifts roller 156 and trips limit switch 157. The resulting electrical signal causes solenoid 163a to become de-energized, reengaging feed clutch 164 and venting both ports of the fluid motor 35 to tank. As mentioned previously, the serrated teeth of the feed clutch members, urged together by hydraulic pressure, act as a decelerating brake to stop the rapid retracting movement of the spindle and attached mechanism, without interference from the fluid motor. The same electrical signal informs the positioning control system that the machining cycle has ended, and the hydraulic system comes to rest, with the locking action of worm 120 and worm gear 99 holding the spindle in its longitudinal position, through the engaged feed clutch 164 (FIG. 10). This position was predetermined for the workpiece involved by the angular adjustment given to cam 153 during the set up. As can readily be seen, the setting of cam 153 has no effect upon the ability of the rapid approach mechanism to carry the tool to the surface of the workpiece at the location of the next hole to be machined, regardless of the level of this surface, nor upon the action of the depth drum cam, such as 31, in causing the tool to feed to the predetermined depth of cut measured from the work surface.

*Electrical circuit*

The electrical circuit which controls the sequence of events described above is shown schematically in FIGURE 11. The entire positioning control system, which may have many variations, as noted previously, is indicated as block 208. This system moves the head carrying the spindle to various centerline positions for the machining of holes in a given workpiece, and transmits sequencing signals to and from the spindle traversing circuit shown in FIGURE 11. In the "at rest" condition, all circuits are open, producing the "at rest" condition of the hydraulic circuit.

The drilling cycle starts when a signal from the positioning control system closes normally open relay contact 202, energizing relay coil 203, and thus causing normally open contacts of the relay, 203a and 203b, to close. The closing of contact 203a produces a circuit through normally closed time relay contact 205a and relay coil 204, as well as through limit switch 34 (normally closed) and relay coil 206, since relay contact 207c is normally closed. The energization of the coil of relay 204 causes normally open contacts of this relay, 204a and 204d, to close, and normally closed contacts 204b and 204c to open. The closing of contacts 203b and 204a produces a circuit through them and solenoid 162a. This brings the hydraulic circuit (FIG. 10) into action and starts the rapid approach of the spindle toward the work.

After the gear train has rotated a short distance, the movement of lug 155 on cam 153 (FIG. 2) allows the roller 156 to drop and closes limit switch 157. This produces a circuit through the coil of control relay 207, and causes the normally open contacts of this relay, 207a and 207b, to close and contact 207c to open. The opening of contact 207c, however, does not break the circuit through the coil of relay 206 since the previous energization of this coil had closed holding contact 206b. The closing of contact 207a gives a circuit through time relay coil 205.

After the spindle and attached members have accelerated to normal traverse speed, hydraulic pressure builds up in pipe line 176 (FIG. 10) causing normally open pressure switch 160 to close. This maintains a circuit through contact 204d and keeps relay coil 204 energized as long as the spindle moves at its rapid approach rate. After a short time, the time-open contact of time relay 205, 205a, opens and places relay coil 204 under the control of pressure switch 160. Time delay relay contact 204a is needed to provide a means of keeping control relay coil 204 energized through the period of spindle acceleration, before pressure switch 160 has closed. The circuits described above remain made through the rapid approach phase until the tool strikes the surface of the workpiece. When this occurs, pressure switch 160 opens as described previously, de-energizing control relay coil 204. This opens contacts 204a and 204d and closes contacts 204b and 204c. The closing of contact 204b produces a circuit through previously closed contact 206a and drum clutch coil 70a, engaging clutch 70 and tying the depth dog drum 30 to shaft 51 (FIG. 6) assuring that the drum will rotate as the tool feeds into the work. The opening of contact 204a de-energized solenoid 162a, venting the ports of fluid motor 35, and engaging feed clutch 164 (FIG. 10. At the same time, the closing of contact 204c gives a circuit through previously closed contact 206c and energizes solenoid 167a, engaging worm clutch 130 to allow feed driving unit 121 (FIG. 3) to move the spindle longitudinally at a preset feed rate, to start the feeding phase of the cycle. After the drum 30 (FIG. 5) has rotated a short distance from its stop, normally closed limit switch 150 closes, producing a holding circuit for drum clutch coil 70a, around relay contact 206a. The circuits last described are maintained through the feeding phase, or until the tool has reached the desired depth in the work. When the depth has been reached, limit switch such as 34 is opened, de-energizing control relay coil 206, opening contacts 206a, 206b and 206c, and closing contact 206d.

FIG. 5 shows that each adjustable cam ring 31 is in the same plane as the roller on one of the limit switches 34. The opening of contact 206a has no effect upon the circuit and the drum clutch remains engaged. The opening of contact 206c de-energizes solenoid 167a, disengaging worm clutch 130, which must remain disengaged until the start of the next cycle, because the continuously running feed driving unit 121 would otherwise resume feeding the spindle out immediately after the completion of the current cycle, since the feed clutch 164 will be reengaged.

When contact 206d closes, a circuit is completed through previously closed contact 207b, energizing solenoid 163a and starting the rapid return movement of the spindle.

The circuits just described are maintained as the spindle retracts, until limit switch 150 is opened just before the drum 30 reaches its stop. This breaks the circuit containing limit switch 150 and de-energizes drum clutch coil 70a, releasing the drum and allowing it to come to rest against its stop. The spindle continues its rapid retracting movement until limit switch 157 is opened, signaling the completion of the retraction phase. This breaks the circuit containing limit switch 157, de-energizing relay coil 207 and open-contact 207b, and causing solenoid 163a to become de-energized. The hydraulic action now brings the spindle and attached members to rest at zero reference position, completing the cycle. The opening of limit switch 157 simultaneously signalled the positioning control 208 that the cycle had been completed, and a return signal from control 208 had immediately opened relay contact 202, de-energizing the entire electrical circuit. The positioning control system, having been triggered into action, now causes the head carrying the spindle to move to the next hole center, or to signal the completion of the workpiece, whichever is required by the program. The movement of the spindle mentioned here is relative, and may actually be a movement of the head in one plane, accompanied by a movement of the work in another, or an action of slides in two planes. The control system 208 also preselects the feed rate and spindle rotation rate and activates the proper limit switch, as 34, from the bank of nine, as programmed for the particular hole to be machined.

Having described my invention, what I claim as new and useful and desire to secure by United States Letters Patent is:

1. An apparatus for automatically controlling a traversing spindle carrying a tool in a machine comprising a spindle, a tool in said spindle, hydraulic fluid means for effecting traverse of said spindle, said hydraulic fluid exerting fluid pressure in response to presettable automatic control means, and presettable control means initially operable to move said spindle to contact with a workkpiece, means for stopping the flow of fluid pressure upon contact of said tool in said spindle with said workpiece a power feed, and means for simultaneously engaging said power feed, when said tool contacts said workpiece, comprising, a pressure switch, an electrical element in said pressure switch, said electrical element in said switch producing a signal when the flow of fluid pressure is stopped, a power feed for said spindle, said power feed activated by said signal from said electrical element, and means for feeding said tool into a workpiece to a predetermined depth and means for rapidly retracting said spindle and tool from said workpiece after a predetermined depth of said tool has been reached.

2. An apparatus for automatically controlling a traversing spindle carrying a tool in a machine tool comprising, a spindle, a tool in said spindle, means for traversing said spindle and tool to a workpiece, means for feeding said tool, means for retracting said tool, all at predetermined speeds, including a hydraulic fluid motor operable to cause fluid pressure to move said spindle and tool to said workpiece, valve means operable upon contact of said spindle with said workpiece to stop said flow of fluid pressure, a power feed, said power feed operable upon contact of said spindle and tool to said workpiece, electrical contacts means operable to cause the feeding of said tool, means for feeding said tool to a presettable depth, means operable when said predetermined depth of feed has been reached to activate said hydraulic motor to cause fluid pressure to retract said spindle and tool from said workpiece.

3. An apparatus for successively automatically traversing and feeding a tool carrying spindle in a machine tool from a presettable reference position at a constant speed to the workpiece, means for selectively feeding said tool to a predetermined depth into a workpiece, means for initiating said feeding movement when said tool contacts said workpiece, said movement automatically measured from the surface of said workpiece, and means for retracing said tool from the workpiece to said reference position, said successive automatic traversing, feeding and retracting automatically responsive to varying positions of a workpiece from and to the presettable reference position.

4. An apparatus for automatically successively feeding a tool into a workpiece from a predetermined reference point and at varying depths from said workpiece comprising, a tool carrying spindle in a machine tool, said tool carrying spindle automatically movable from a presettable reference position at a constant speed to the workpiece, means for selectively feeding said tool to a predetermined depth into a workpiece, and means for retracting said tool from the workpiece to said reference position, said means for moving said tool to said workpiece including a hydraulic motor for exerting fluid pressure on said spindle and tool, said hydraulic motor operable to stop the fluid flow of pressure upon the contact of said spindle and tool with said workpiece, a power feed, said power feed simultaneously engageable upon contact of said spindle and tool with said workpiece, automatic means for feeding said tool into said workpiece, and means when said tool has reached a presettable depth in said workpiece for retracting said spindle and tool from said workpiece, said spindle and tool being retracted to its initial reference position, all of said means operable successively to feed said tool to said predetermined depth at varying points on said workpiece and at varying distances from said initial reference position.

References Cited by the Examiner

UNITED STATES PATENTS

| | | | |
|---|---|---|---|
| 2,071,539 | 2/1937 | Kingsbury | 77—32.7 |
| 2,854,869 | 10/1958 | Hirvonen | 77—32.1 |

FRANCIS S. HUSAR, *Primary Examiner.*